United States Patent [19]
Wolff et al.

[11] Patent Number: 5,671,282
[45] Date of Patent: Sep. 23, 1997

[54] METHOD AND APPARATUS FOR DOCUMENT VERIFICATION AND TRACKING

[75] Inventors: Gregory J. Wolff, Mountain View; David G. Stork, Stanford; K. Venkatesh Prasad, Cupertino, all of Calif.

[73] Assignees: Ricoh Corporation, Menlo Park, Calif.; Ricoh Company, Ltd., Japan

[21] Appl. No.: 376,861

[22] Filed: Jan. 23, 1995

[51] Int. Cl.⁶ ................................................. H04L 9/00
[52] U.S. Cl. ................................. 380/25; 380/51; 380/55; 380/825.34
[58] Field of Search ................................. 380/25, 51, 55; 340/825.34, 825.31

[56] References Cited

U.S. PATENT DOCUMENTS

| | | | |
|---|---|---|---|
| 4,641,347 | 2/1987 | Clark et al. | 380/51 |
| 4,893,338 | 1/1990 | Pastor | 380/51 |
| 5,022,080 | 6/1991 | Durst et al. | 380/51 |
| 5,157,726 | 10/1992 | Merkle et al. | 380/55 |
| 5,337,361 | 8/1994 | Wang et al. | 380/51 |
| 5,341,428 | 8/1994 | Schatz | 340/825.34 |
| 5,422,954 | 6/1995 | Berson | 380/51 |
| 5,426,700 | 6/1995 | Berson | 380/51 |
| 5,440,633 | 8/1995 | Augustine et al. | 380/25 |
| 5,471,533 | 11/1995 | Wang et al. | 380/51 |
| 5,513,264 | 4/1996 | Wang et al. | 380/51 |

*Primary Examiner*—Salvatore Cangialosi
*Attorney, Agent, or Firm*—Blakely, Sokoloff, Taylor & Zafman

[57] ABSTRACT

A document processing system in which a server subsystem stores information corresponding to a document containing human readable and machine readable information and a client subsystem receives the document and interprets the machine readable information. The client subsystem contacts the server to verify validity of information in the document using a communications network that allows information to be exchanged between the server and the client.

30 Claims, 5 Drawing Sheets

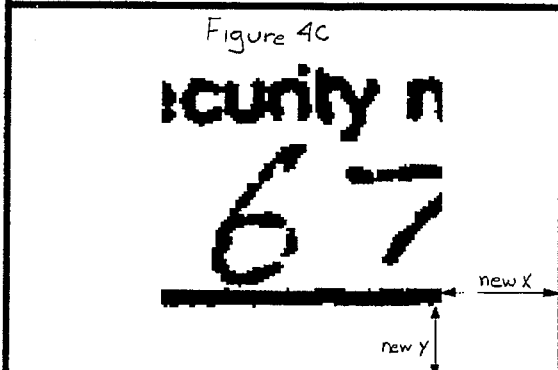
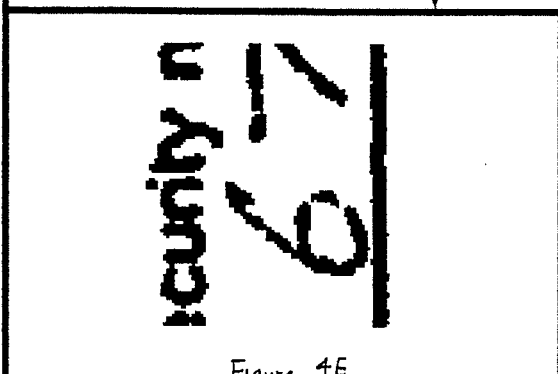

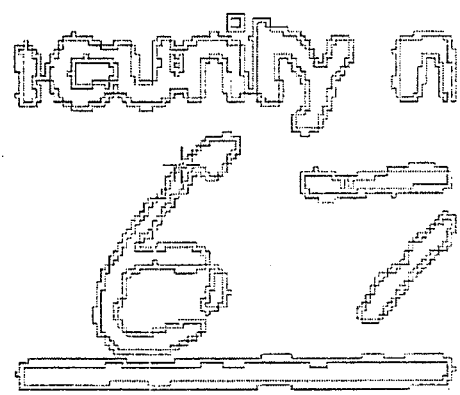
Figure 5A
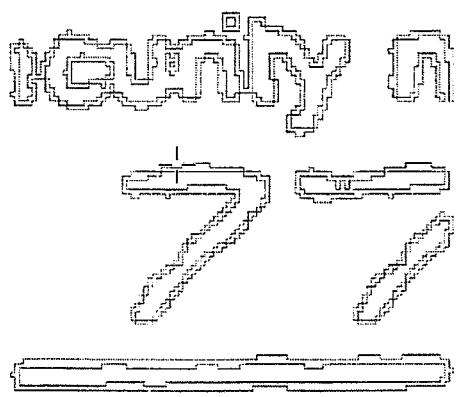
Figure 5B
X,Y: 47.5514, 66.4953
| Token | Feature | Value |
|---|---|---|
| TS.46 | HEIGHT | 3 |
| TS.46 | WIDTH | 3 |
| TS.46 | LOG-OF-H-TO-W | 0.00 |
Figure 5C
X,Y: 46.3285, 65.5033
| Token | Feature | Value |
|---|---|---|
| TS_DUP0.40 | HEIGHT | 2 |
| TS_DUP0.40 | WIDTH | 19 |
| TS_DUP0.40 | LOG-OF-H-TO-W | -0.98 |
Figure 5D

METHOD AND APPARATUS FOR DOCUMENT VERIFICATION AND TRACKING

FIELD OF THE INVENTION

The present invention relates to the field of document verification and tracking; more particularly, the present invention relates to tracking, control, authentication and verification of paper and electronic documents.

BACKGROUND OF THE INVENTION

Many documents have to be authenticated to verify or prove the validity of the information they contain. For example, legal contracts, drivers licenses, passports, and the like, all require some proof of authenticity to be considered valid. Often this burden rests on the bearer of the document. Common forms of proof include signatures, holograms, seals, etc., which depend on their difficulty of reproduction to prevent forgery. Therefore, these documents themselves include some level of proof of authenticity.

For example, drug prescriptions in the United States that allow patients to purchase controlled substances are usually written on a doctor's letterhead, and include the doctor's signature and identification number, as well as the name and type of medicine to be purchased. Thus, a prescription typically consists of a printed out portion (e.g., letterhead, etc.) and the filled-in portion (often handwritten), and proof that a prescription is authentic may be based on the fact that both the letterhead of the document and the signatures are difficult to reproduce.

Documents may be altered, however, with such alterations being extremely difficult to detect. For prescriptions, the printed portion and the filled-in portion are visually distinct, thereby making it easy to "change" or alter the filled-in portion. For instance, with prescriptions, unscrupulous individuals can (and do) "white out" the written prescription and then photocopy the blank form. At that time, a different prescription may then be written in on these forms for their own desired drugs, so that large quantities of substances may be obtained through legitimate pharmacies. Therefore, even though documents may include some form of proof of authenticity, a document may not contain valid data. It is desirable to provide a system that is able to prove or verify document authenticity, while providing a more reliable means of ascertaining the necessary proof.

Data networks, covering both local areas or larger areas (e.g., global), exist providing communication capabilities over various distances. Such networks allow users at remote locations to access desired data and communicate with other remote locations or central hub-like areas. One such network is employed in credit card verification.

Credit cards are verified through the use of machine readable technology that allows a credit card to be inserted and read by a verification machine. Upon sliding the card through the machine, the card is read and a database is accessed by which it is determined whether the card is valid and whether the amount to be charged comes under the available limit of the card. The database may be located nearby or at some other central location. However, these systems do not authenticate printed or written data on paper documents.

The present invention provides a system that supports verification of paper documents, including their authenticity with respect to the information contained thereon. The present invention has a number of applications, with one particular application being prescription verification and tracking. The present invention provides a system of combining the filled-in portion of a prescription (or other form) with the printed portion.

SUMMARY OF THE INVENTION

A document processing system is described. The document processing system of the present invention includes a server subsystem storing information corresponding to a document containing human readable and machine readable information. Also included in the document processing system is a client subsystem that receives the document and interprets the machine readable information. Using information on the document, the client subsystem contacts the server to verify validity of information in the document. The contact between the server subsystem and the client subsystem is accomplished using a communications network that allows information to be exchanged between the server and the client.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4A illustrate a portion of the document.

FIG. 4B illustrates a magnified version of the document of FIG. 4A.

FIG. 4C illustrates the magnified version of the document of FIG. 4A unchanged in content, but shifted from its original position in FIG. 4A to a new position closer to the right and upper borders.

FIG. 4D illustrates the magnified version of the document of FIG. 4A changed.

FIG. 4E illustrates the magnified version of the document of FIG. 4A that is unchanged in content, but rotated 90 degrees with respect to its original position in FIG. 4A.

FIG. 4F illustrates the magnified version of the document of FIG. 4A that is unchanged in content, but is rotated 180 degrees (i.e., flipped over) with respect to its original position in FIG. 4A.

FIG. 5A the tokens within a block.

FIG. 5B illustrates the tokens within a "changed" block located at the same position with respect to the document as the block in FIG. 5A.

FIG. 5C tabulates same shape values associated with the token located beneath the cross-hair in FIG. 5A.

FIG. 5D tabulates same shape values associated with the token located beneath the cross-hair in FIG. 5B.

DETAILED DESCRIPTION OF THE PRESENT INVENTION

A document verification and tracking system with special applications to drug prescription disbursement is described.

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Overview of the Document Verification and Tracking System

Figure 1:
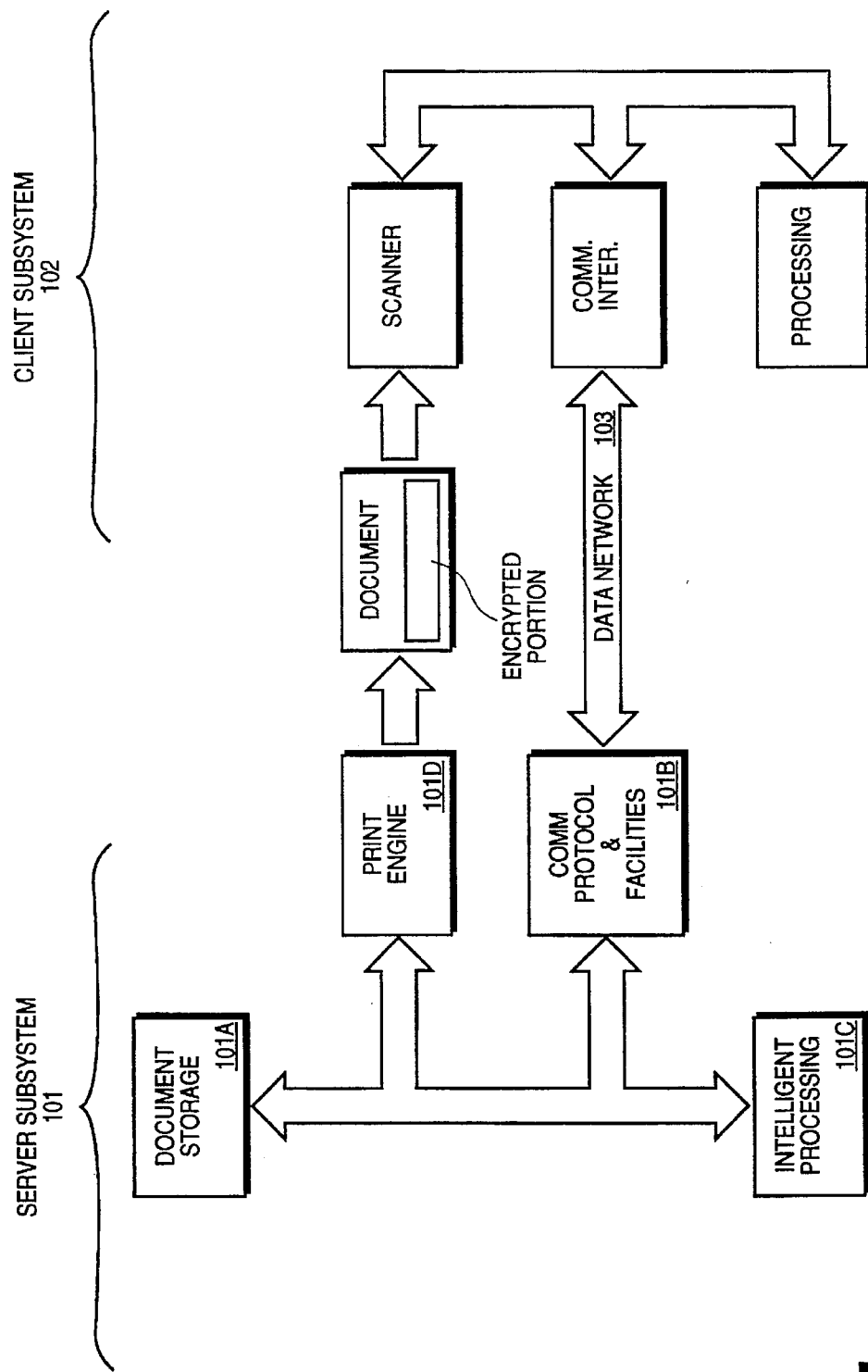
FIG. 1 is a block diagram of one embodiment of a document processing system of the present invention.

FIG. 1 is a block diagram of one embodiment of the document verification and tracking system of the present invention. It will be understood that while FIG. 1 is useful for providing an overall description of the system of the present invention, a number of the details of the system are not shown. As necessary for the disclosure of the present invention, further detail is set forth with reference to the other figures provided with this specification.

As is illustrated in FIG. 1, the system, as may be utilized by the present invention, generally comprises a server subsystem 101 and a client subsystem 102. The server subsystem 101 and the client subsystem 102 are coupled together using a data network. Although the system of the present invention is shown with only one server subsystem and only one client subsystem, other configurations having multiple servers and/or multiple clients may be possible.

The document verification and tracking system of the present invention allows the bearer of a document to demonstrate the authenticity of the document to a third party. The system of the present invention uses machine readable information (e.g., digital information) printed on paper documents as part of the verification process. The machine readable information is specific to the document allowing it to be tracked.

In one embodiment, the server subsystem 101 provides two main functions. First, the server subsystem 101 is responsible for creating a paper document with both human readable and machine readable information. The machine readable information on the paper document corresponds, in part, to the human readable information on the paper document. Second, the server subsystem 101 maintains an electronic version of the paper document for use in verification and document tracking. The client subsystem 102 receives the paper document and using the information contained in the document contacts the server subsystem 101 via the network 103. The server subsystem 101 uses its archived electronic version and indicates to the client subsystem whether the document contains valid information. That is, the server subsystem 101 verifies the validity of the document and the information it contains.

The authenticity verified by the server subsystem 101 in response to information sent by the client subsystem 102 may include a determination as to whether the information contained on the paper document is valid. The system of the present invention uses the machine readable information to determine whether a change has been made to the human readable information. Such a change might have been made by the bearer of the document (e.g., an unscrupulous prescription modification). Thus, the present invention provides for tracking between the human readable information and the machine readable information on the paper document. In addition to verification, the system of the present invention may also support version control and automatic forms processing.

The server subsystem 101 is maintained by each individual author of printed documents. The server subsystem 101 comprises document storage 101A for storing copies, descriptions, and tracking information for all documents the author creates (e.g., publishes). Database management software may be included in the server subsystem 101 to coordinate access and operation of document storage 101A. Communications facilities 101B are includes for handling requests from clients to verify the authenticity and information of a document. Intelligent processing 101C is also included in the server subsystem 101 to allow the server to reduce the information exchange that is necessary for verification. The intelligent processing 101C may also produce updated documents, if any are available, or prevent documents from being verified again. The intelligent processing 101C of the server subsystem 101 may prevent documents from being "re-verified" by removing them from the document storage 101A.

The server subsystem 101 may also include a print engine 101D that creates hard copy images of documents to be published. The print engine 101D may include software running on a computer system to print out the machine readable information, such as bar codes. Note that in one embodiment these images may be electronic images. Each image includes a machine readable portion and a human readable portion. The machine readable portion is an encoded version of information about the document (e.g., information in the human readable portion), and in one embodiment may include a unique identifier, version number, date, and other relevant information (e.g., a drug name for a prescription). In one embodiment, the machine readable information is a 2D barcode. The machine readable information may be encrypted. The print engine 101D may not be included in the server subsystem 101 where the documents are created separately from the server subsystem 101 and entered into the server subsystem 101 after their creation.

The server subsystem 101 may be implemented as a computer system, in hardware and/or software. For instance, document storage 101A may comprise the main memory (e.g., a random access memory (RAM) or other dynamic storage device) or hard disk storage of the computer system. The communication facilities 101B may include hardware and/or software in the computer system that enable communication over a data network (e.g., a modem) as well as perform queries. The intelligent processing 101C may be include a processor in the computer system executing instructions from memory. The print engine 101D may include the processor of the computer system cooperating with a printer or hardcopy peripheral in the computer system.

The computer system of the server subsystem 101 may also include a bus or other communication means 101 for communicating information between the various components and devices, a read only memory (ROM) and/or other static storage device 106 coupled to bus 101 for storing static information instruction for intelligent processing 101C, and a data storage device 107 such as a magnetic disc or optical disc and its corresponding disc drive, and input/output peripherals. These input/output peripherals may include a display device, such as a cathode ray tube (CRT) or liquid crystal display (LCD) for displaying information to a computer user. An alphanumeric input device, including alphanumeric and other keys, may also be included in the server subsystem 101 for communicating information and command selections to the communications facilities 101B, intelligent processing 101C, and the print engine 101D. An additional user input may include a cursor control, such as a mouse, a trackball, stylist, trackpad or other cursor direction keys, for communicating direction information and command selections to the intelligent processing and for controlling cursor movement on a display included within a server.

System users (e.g., merchants, pharmacists, etc.) desiring to verify documents use the client subsystem 102. The client subsystem 102 includes a scanner 102A for scanning documents. The scanner 102A scans the encoded information. In one embodiment, the scanner 102A also scans other human interpretable information of the document. In one embodiment, client subsystem 102 may include recognition software/hardware (e.g., hand writing recognition) to interpret information on the document, such as signatures. The client subsystem 102 also includes intelligent processing 102B and communication facilities 102C that enable the client subsystem 102 to contact the server subsystem 101 based on the information scanned in order to verify the document. The communications facilities 102C transmit and receive signals from one or more server subsystems. The communications facilities 102C may include query software that receives data, deciphers data, searches and responds to queries from the server subsystem 101. In one embodiment, the client subsystem 102 comprises a computer system similar to that of the server subsystem 101 with additional scanning software and hardware.

The server subsystem 101 and the client subsystem 102 are interconnected with a global network such as a digital network (e.g., Internet). Note that the system of the present invention may be implemented using telephone or ISDN networks. The choice of the network depends on the speed desired or obtainable to the users.

Operation of the System

The present invention operates by having an electronic version of each document available for verifying and tracking a printed document. In the present invention, each author of such a document (e.g., doctor) maintains a server, such as server subsystem 101. An electronic version of the document is stored in document storage, along with descriptions and tracking information. Thus, all documents that are created have a corresponding record stored for use in verification. For instance, if the author is a doctor, the descriptions for all prescriptions provided by the doctor may be maintained in the document storage portion of the server subsystem 101.

The document is generated using the print engine 101C of the server subsystem 101 and includes an encoded region or image portion. In one embodiment, the present invention combines printed portions of a prescription with filled-in portions to create a document with a spatially indistinguishable block (encoded region).

In one embodiment, the encoded information includes a unique identifier, version number, date and other relevant information to identify the printed human readable portion of the document. Other information may indicate the name of a drug, a prescription dosage, patient's name, doctor's name, the current holder of the document and the address of the verifying server. The other information may include location information indicating where human interpretable or other pertinent information is contained on the document, which will be used to identify the authenticity/validity of the document is contained. This location information is referred to herein as "on" pixels. The information may be encoded using existing encoding methods, such as bar coding, and may be encrypted as well.

Each user or merchant (e.g., pharmacist) who desires to verify a document uses the client subsystem 102. The client subsystem 102 is similar conceptually to a credit card verification machine. That is, the client subsystem 102 uses a scanner or similar device to read the encrypted information on the document. Based on that information, the client subsystem contacts the server subsystem of the author of the document (e.g., server subsystem 101) via the network and asks (the server subsystem) to verify the authenticity of the document.

Contact may be performed by reading an address from the document, decoding the address, and then using the address and generating a request for verification to the server subsystem. The communication facilities of the server subsystem handles the requests from client subsystems.

After contact has been made, verification may occur. Verification may include scanning more parts of the image and communicating them to the server subsystem. The amount and type of information needed in order to satisfy the server subsystem that a particular document is indeed the one indicated by the machine readable identifier is dependent on the particular document and the level of confidence desired. In one embodiment, it may be necessary to provide other information scanned from other portions of the document in order to perform verification. The client subsystem would send this information to the server subsystem. Using this information, the server subsystem compares the encoded information with the human readable information on the document. If the server subsystem determines that a discrepancy exists between the two, then the server subsystem indicates that the document is not authentic and its information may be invalid.

Note that each server subsystem may have its own criteria for determining the amount or level of discrepancy that is allowed before a conclusion of inauthenticity or invalidity is reached. Furthermore, the criteria may be defined in terms of manipulatable (e.g., tunable) parameters. Using these parameters, the confidence associated with a "no change" determination can be set.

When the machine readable channel is too small to carry all the relevant information, pyramidal decomposition may be used to localize and focus on discrepancies at a minimum of communications costs. For instance, if a forger adds a zero to change 200 mg prescription to 2000 mg, there would be a mismatch between the bar code and the pixel information versions and the present invention could detect it.

Although a document is authentic, the server subsystem may communicate updated information to the client subsystem. The updated information may include a new version of the document. Other information may be transmitted to the client subsystem, including but not limited to, queries, scheduling requests, and any information which the author desires the bearer of the document to know. The client may communicate information, such as response from filled in boxes on the form, to the server subsystem.

Furthermore, the client may contact additional servers in order to facilitate transaction processing. For example, a pharmacy client may contact the patient's insurance server to obtain payment information. Billing information sent to the patient's insurance company, and so forth, could include the encrypted information (e.g., bar codes), allowing quick and easy access for coordination of billing information from remote sites. This will be particularly useful in tracking down disputes and billing errors, and obtaining accurate, up-to-date billing information.

After verification, the server subsystem may prevent future authorizations. This may be accomplished by removing the document from document storage and/or providing an indication that the document has already been verified previously. This information may also help in record keeping. For instance, doctors would be able to determine if a patient has indeed filled a prescription, which is very important when dealing with very old and forgetful patients and especially when life preserving drugs are involved.

Figure 2:
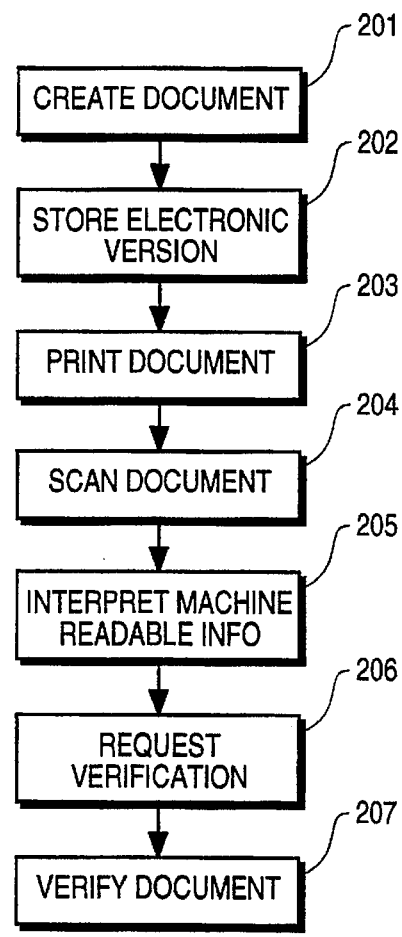
FIG. 2 is a flow chart of the process of the present invention.

The process of the present invention is summarized in the flow chart in FIG. 2. Referring to FIG. 2, initially the document is created having both human readable and machine readable information (processing block 201). An electronic version of the document is stored in the document storage of the server subsystem (processing block 202). The document is then printed and given to the individual, e.g. patient (processing block 203).

At some point in time thereafter, the document is scanned by a client subsystem seeking to verify the documents authenticity (processing block 204). The client subsystem interprets the machine readable information (processing block 205) and contacts the server subsystem requesting verification (processing block 206). The server subsystem verifies the information on the document (processing block 207), possibly confirming the documents validity, confirming billing/insurance information, transferring funds, and/or preventing future authorizations.

The Prescription Process of the Present Invention

Figure 3:
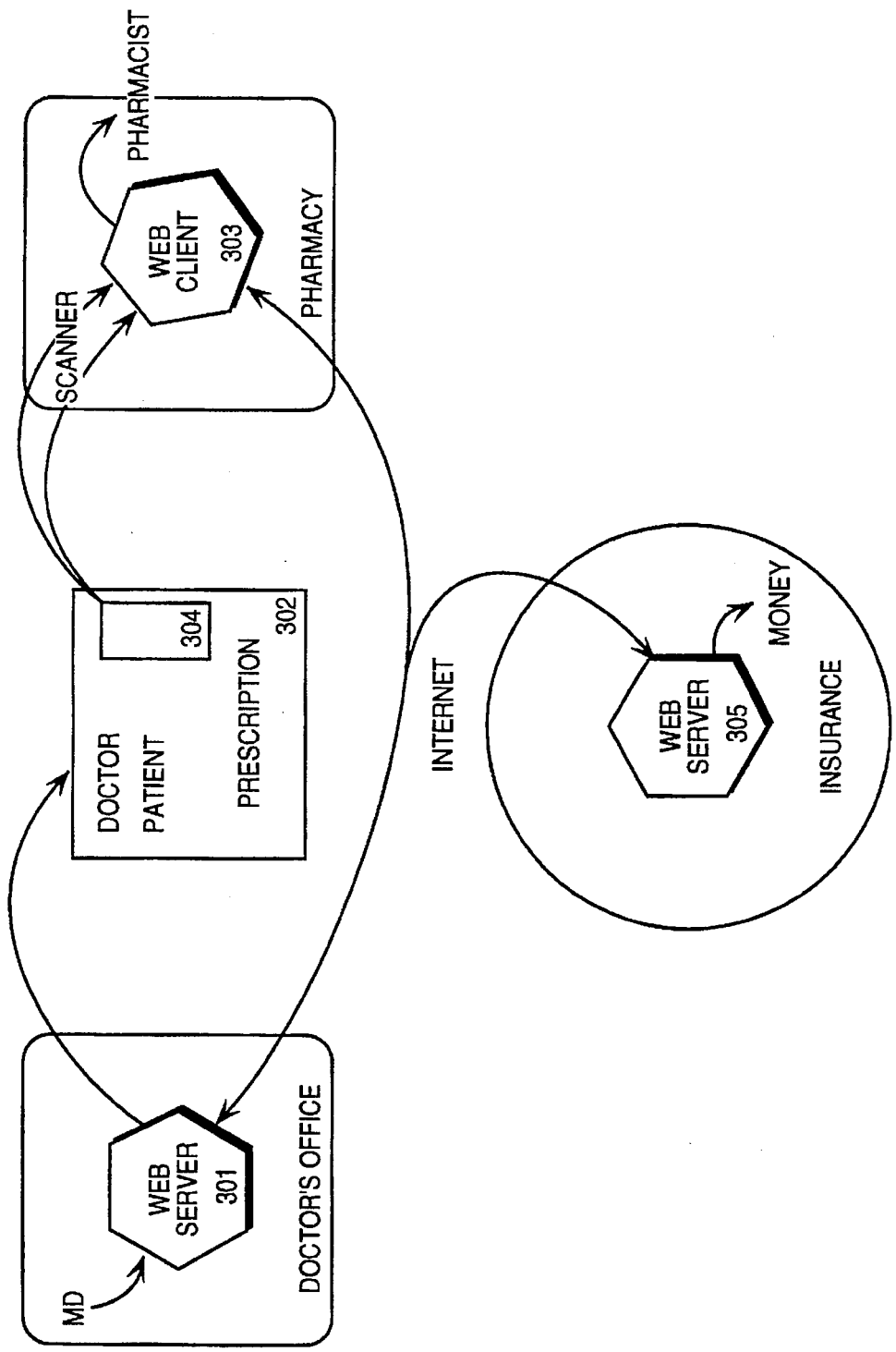
FIG. 3 illustrates one embodiment of the prescription system of the present invention.

The present invention may be used with prescriptions for drugs and medicines. FIG. 3 illustrates such an application. Referring to FIG. 3, a physician uses a server subsystem to generate a prescription 302—a piece of paper containing the name of the drug, dosage, patient name, physician's name and an identifier in both human and machine readable form. An electronic copy is stored on a server subsystem 301, while a physical paper is given to the patient. In one embodiment, the physician uses a personal digital assistant (PDA) to enter the prescription, along with other medical records.

The patient takes the prescription to the pharmacy where the prescription is scanned by a client subsystem 303 by the pharmacist (or an individual assisting the pharmacist). The client subsystem 303 interprets the machine readable information 304 using, for instance, a scanner, and, using that information, contacts the physician's server subsystem via a data network (e.g., World Wide Web, Internet, etc.). The server subsystem 301 confirms that the prescription 302 is valid, that it has not already been filled, and that no new/conflicting prescriptions or instructions have been issued to this patient.

Based on this authorization from the server subsystem 301, the client (e.g., pharmacist) fills the prescription 302 and the server subsystem 301 marks the prescription as having been filled, preventing future authorizations. The pharmacy client 303 may also contact the server subsystem 305 operated by the insurance company or the patient, based on information encoded on the prescription 302, a card carried by the patient, or available from the physician's server 301. The insurance server 305 verifies the insurance and billing information for the patient, possibly even transferring funds to the pharmacist.

Encryption

In one embodiment, encryption and decryption are used in the present invention. The machine readable portion of the paper document contains encrypted information to ensure security. During the verification process, the client subsystem must decrypt the information. In one embodiment, the machine readable portion of the document is encrypted using bar codes. In another embodiment, the document is encrypted using a technique described in U.S. Pat. No. 5,337,362, entitled "Method and Apparatus for Placing Data onto Plain Paper," issued Aug. 9, 1994.

In another embodiment, pixel information regarding the document is encoded into the machine readable portion of the document as a means for determining if a change has occurred to the document. The pixel information may include the number of pixels located in a certain portion (e.g., block) of the document. In one embodiment, the pixel information may include the location on the document of the pixels that are to undergo change detection (e.g., "on" pixels, locations where entries are supposed to be written or printed, etc.), as well as information about the pixels to enable a server of the present invention to determine if a change has occurred to that portion of the document.

In one embodiment, the encryption is accomplished using software in a computer system. In one embodiment, the software encryption is provided by exclusive-ORing the initial data with a pseudo-random sequence generated using a secret key as a seed. Note that in this case, the decryption performed by the client subsystem is simply exclusive-ORing the data with the same pseudo-random sequence. Note that this type of encryption process is not perfectly secure method of data encryption because of the short key length used to seed pseudo-random sequences and the fact that the same key is likely to be used on more than one message. There are well-known methods to attack this type of encryption.

In order to obtain secure data through encryption, a one time pad can be employed in place of the pseudo-random sequence. A one time pad comprises a series of randomly generated bits that are known to both parties (i.e., the "encrypting" party and the "decrypting" party) and is only used once in the encryption process. In a one time pad, the key length is equal to the message length and may be more than 100,000 bits. Since the one time pad is used once, it is not susceptible to the same attacks which are used on pseudo-random sequences.

In another embodiment, encryption processing could be performed using the digital encryption standard (DES) or the RSA algorithm. In the RSA algorithm, digital data is encrypted using two prime numbers which are multiplied together, as is well-known in the art. In the case where each of the two prime numbers has approximately 200 digits, the RSA algorithm offers a very secure encryption method. Note that to use DES in one of the feedback modes or to use the RSA algorithm, it is necessary that errors do not occur in the encoding and decoding of the digital data stream. If an error occurs, any information beyond the location of the error would be lost. It should be noted that any digital encryption method may be employed with the present invention.

In one embodiment, the decryption process requires the use of the same key used during encryption. By using the same key, the original data is recreated.

When the methods of encryption (and decryption) of the present invention are being integrated into the processes of the present invention, the present invention also provides data information to be transferred on a portion of the plain paper in a manner which preserves its privacy and/or authentication. In the present invention, this privacy can easily be obtained through the use of a key or code known to the user(s) when encryption and decryption of a document occurs.

Document Change Detection

In one embodiment, it is necessary to insure that no change has been made to a document. The present invention provides a method for determining whether a "meaningful" change has been made in the pixel representation of a printed (e.g., paper) document containing text, business graphics, etc. The procedure and apparatus for the document change detection of the present invention enables security by providing correspondence between machine readable information (e.g., a bar code) and the human interpretable information it accompanies.

The document change detection procedure of the present invention relies on a checksum (a scalar measure of the pixel distribution) over blocks. The method of the present invention is sensitive to changes, but relatively insensitive to random noise. In other words, the function used in the present invention will not flag an error under typical copier variation, but is sensitive to deliberate alteration.

The method of the present invention employs two tunable parameters: the total number of cells and a tolerance for match within any cell. In one embodiment, these tunable parameters control the level of confidence regarding the presence or absence of a change in the document. To achieve a higher confidence, greater side channel information may be required.

Tunable Parameters

An image I is initially tessellated into (M×N) blocks. The tessellation of an image is a process well-known to those skilled in the art. A (MN×1) CheckSum vector C is used to measure the document content. Each element of C is a functional ($C_i$), called the Block CheckSum Measure, defined over a block $b_i$.

The Block CheckSum Measure

In overview, the method of the present invention divides the document into a number of blocks, and computes for each block a scalar quantity that would be changed if the document is altered. The pixel distribution within each block is first transformed into a set of "tokens," which in this case are polygonal approximations of the pixel intensity edges detected within the block. FIGS. 5A and 5B show the original images (FIGS. 4B and 4D, respectively) transformed into a chain of connected polygons (tokens), each with an associated height and width. In one embodiment of the algorithm, M, N, and θ are initialized to M=N=4 and θ=0 degrees. Then, for each block $b_i$, $1 \leq i \leq MN$ in an image I, a CheckSum $C_i$ value is computed according to the equation:

$$C_i = \sum_{\forall k \in K} \frac{1}{J_i} \sum_{\forall j \in J_i} a^k(A_j^k),$$

where j is a token-index, $J_i$ is the number of tokens in the block i, $A_j^k$ is the scalar real-numbered value of the kth feature of the jth token, and $a^k$ is a weighting function that determines the relative weights of K different features. Using the above equation, various features may be computed, including but not limited to width, height, perimeter and aspect-ratio.

For example, a symmetric aspect-ratio function $A_j$ is defined as:

$$A_j = abs\left[\log\left(\frac{h_j}{w_j}\right)\right],$$

where $h_j$ and $w_j$ denote the height and width, respectively, the jth token. The Block CheckSum function is obtained using the above-referenced CheckSum equation. Note that the scalar variable $a^k$ is used to weight the importance of different features. Since only one feature was used in this example, $a^k=a^1=1$ and $$C_i = \frac{1}{J_i} \sum_{\forall j \in J_i} (A_j).$$

In this example, $C_i$, in the Block CheckSum function, reduces to the mean aspect ratio function. FIGS. 4A–4F and FIG. 5 illustrate the document change detection of the present invention. FIG. 4A illustrates a sample image. In this case, the sample image shown in FIG. 4A is a portion of a scanned W4 form. The sample image is divided into multiple blocks, one of which is shown magnified in FIG. 4B. FIGS. 4C–4F illustrate the magnified portion of FIG. 4B unchanged in content but is shifted in an (X,Y) direction (FIG. 4C), changed where a 7 replaces the 6 (FIG. 4D), rotated 90° to the left (FIG. 4E), and rotated 180° (FIG. 4F). Note that in FIG. 4C, the original image is shifted to a position that is closer to the right and upper borders.

When the Block CheckSum function is evaluated for the blocks in FIGS. 4B–4F, the resulting scalar number (checksum) is identical for the blocks in FIGS. 4B, 4C, 4E and 4F, while the result for the block in FIG. 4D is different. Therefore, the present invention will detect the block where the 7 is replaced by 6 since it has a different CheckSum number, but will not cause a false alarm if the block is merely shifted or rotated.

FIG. 5 depicts two blocks extracted from the same locations in two differing images along with their feature values. The edges detected within each block are approximated by a chain of polygonal boxes (tokens) defined by a width (w) and a height (h). The difference between the upper images (blocks) is detected by computing the average of the absolute values of all the "log-of-h-to-w"

$$\left(\log\frac{h}{w}\right)$$

values for all the boxes that compose the edges in the block). The lower row in FIG. 5 shows the shape values computed at regions around the cross-hairs.

The present invention provides for cheap, verifiable documents based on existing hardware, such as laser printers and scanners. The present invention also allows document databases to be distributed and under author control. Each author is free to set up their own criteria for authenticity, which may be document dependent, and monitor the use of each of the other documents, and provide timely updates to clients. Audit trails, both electronic and paper, may be generated. In the present invention, documents may change hands or forms (e.g., electronic to paper) several times, and still be verifiable.

The present invention may also be extended to other systems besides prescription verification. The system of the present invention could function as a corporate library, allowing remote patrons to obtain documents, possibly scanning in their library card for authentication. Legal offices could use the present invention to control access to documents and maintain version information. Each document would include encrypted information (e.g., 2D bar code) which encodes, among other things, information about who can make copies of the document. Intelligent copiers would then require an authentication code or card before permitting the duplication of a document. Lists of who has seen/copied the document may also be maintained by the server subsystem.

The server subsystem of the present invention could also maintain version control of documents, preventing a document from being simultaneously modified in conflicting ways by multiple authors.

Automated forms processing could also be supported by the system of the present invention. The client subsystem could be used to contact a server subsystem, verify a particular form, and identify any discrepancies with the original, such as the filled in portions. This new information could be forwarded to the server subsystem for processing.

Furthermore, a catalog could include these 2D bar codes or other machine readable indicia, so that a customer need only circle the desired items to order them.

Whereas, many alterations and modifications of the present invention will no doubt become apparent to a person of ordinary skill in the art after having read the foregoing description, it is to be understood that the particular embodiment shown and described by way of illustration are in no way to be considered limiting. Therefore, reference to the details of various embodiments are not intended to limit the scope of the claims which themselves recite only those features regarded as essential to the invention.

Thus, a document verification and tracking system has been described.

We claim:

1. A document processing system comprising:
    a server subsystem storing an electronic version of information corresponding to a document containing human readable information and machine readable information that corresponds, at least in part, to the human readable information;
    a client subsystem that scans both the human readable information and the machine readable information in response to receipt of the document and interprets the machine readable information, wherein the client subsystem uses information in the document to contact the server subsystem to request verification of information in the document; and
    a communications network coupled to the server subsystem and the client subsystem for exchanging information therebetween,
    wherein the server subsystem verifies the information on the document based on a comparison between a portion of the information on the document provided by the client subsystem and the electronic version and, thereafter provides an authentication indication to the client subsystem once verification has been concluded.

2. The system defined in claim 1 wherein the machine readable information comprises a bar code.

3. The system defined in claim 1 wherein the machine readable information comprises encrypted information.

4. The system defined in claim 1 wherein the document comprises a prescription.

5. The system defined in claim 1 wherein the machine readable information includes an identifier indicating an address of the server.

6. The system defined in claim 1 wherein the server subsystem comprises a print engine to generate the document.

7. The system defined in claim 6 wherein the print engine encodes pixel information corresponding to the document in the machine readable information.

8. The system defined in claim 7 wherein the pixel information indicates the number of pixels in the human readable information.

9. The system defined in claim 7 wherein the pixel information comprises location data indicating the location of pixels on the document to be used in verification.

10. The system defined in claim 1 wherein the server subsystem comprises:
    a document storage for storing the electronic version of the document;
    a document coordinator for servicing requests from the client subsystem; and
    communications facilities coupled to the document coordinator and the network for receiving requests from the client subsystem and providing responses to the client subsystem using the network.

11. The system defined in claim 1 wherein the communications network comprises the Internet.

12. The system defined in claim 10 further comprising a processing unit coupled to the client subsystem for providing an updated version of the document in response to a request.

13. The system defined in claim 10 further comprising a processing unit coupled to the server subsystem for preventing the server subsystem from responding to requests concerning the document.

14. The system defined in claim 10 further comprising a processing unit coupled to the document storage for removing the document from document storage.

15. The system defined in claim 10 further comprising a print engine to create the document.

16. The system defined in claim 15 wherein the print engine creates the document by encoding pixel information for verifying the human readable information.

17. The system defined in claim 1 wherein the client subsystem comprises a document scanner to read the document, interpret the machine readable information, and to contact the server subsystem; and
    a communication interface for sending queries to the server subsystem and receiving responses to those queries from the client subsystem.

18. The system defined in claim 1 wherein the communications network comprises the World Wide Web (the Web).

19. The system defined in claim 1 wherein the client subsystem scans at least a portion of the document information and communicates said information to the server subsystem to enable completion of document verification.

20. The system defined in claim 19 wherein the server subsystem performs document change detection.

21. The system defined in claim 20 wherein the amount of change required to indicate that the document has been changed is tunable.

22. The system defined in claim 21 wherein the change detection is tuned based on user selection.

23. The system defined in claim 20 wherein the server subsystem performs document change detection by computing a first CheckSum over a plurality of blocks of said at least a portion of the document information and a second CheckSum computed over blocks of said at least a portion in the stored version of the document, and comparing the first and second CheckSums for a difference, wherein the server subsystem detects a change when a difference is determined to exist between the first and second Check-Sums.

24. A method for processing a document having both human readable information and machine readable information specific to the document and corresponding, in part, to the human readable information, said method comprising the steps of:
    scanning the document;
    a first subsystem interpreting the machine readable information in the document;
    the first subsystem contacting, using information in the document, a second subsystem over a network to verify information in the document using the human readable information and the machine readable information;
    the second subsystem verifying information in the document in response to information provided by the first subsystem; and the second subsystem indicating validity of the information in the document to the first subsystem.

25. The method defined in claim 24 further comprising the step of generating the document so that the machine readable information tracks the human readable information.

26. The method defined in claim 24 further comprising the step of preventing re-verification of the document of the document.

27. The method defined in claim 26 wherein the step of verifying comprises comparing the filled-in information on the document with printed portions of the document.

28. The method defined in claim 24 further comprising the step of locating human readable information in the document based on other information contained in the document.

29. The method defined in claim 24 further comprising storing electronic copy of the document, and the second subsystem performing verification using the electronic copy and information received from interpretation of the machine readable information.

30. The method defined in claim 29 further comprising the step of the second subsystem detecting changes between the electronic copy and information received from interpretation of the machine readable information and human readable information, if any, and indicating that the document is not authentic if change is detected.

* * * * *